United States Patent
Chen et al.

(10) Patent No.: US 6,187,157 B1
(45) Date of Patent: Feb. 13, 2001

(54) MULTI-PHASE SOLID ELECTROLYTE IONIC TRANSPORT MEMBRANE AND METHOD FOR FABRICATING SAME

(75) Inventors: Chieh-Cheng Chen, Getzville; Ravi Prasad, East Amherst, both of NY (US)

(73) Assignee: Praxair Technology, Inc., Danbury, CT (US)

(*) Notice: Under 35 U.S.C. 154(b), the term of this patent shall be extended for 0 days.

(21) Appl. No.: 09/241,611

(22) Filed: Feb. 2, 1999

Related U.S. Application Data

(63) Continuation-in-part of application No. 08/775,683, filed on Dec. 31, 1996, now Pat. No. 5,911,860.

(51) Int. Cl.[7] .................................................. C25B 13/00
(52) U.S. Cl. .............................. 204/296; 429/30; 429/33; 429/46; 429/304; 429/306; 252/519.33; 252/519.1; 252/519.2; 501/123; 501/126; 501/132; 501/152; 96/11; 96/12; 96/13; 96/14; 95/45
(58) Field of Search ..................... 501/123, 126, 501/132, 152; 252/519.33, 519.1, 519.2; 429/30, 33, 46, 304, 306; 204/295, 296; 96/14, 11, 12, 13; 95/45

(56) References Cited

U.S. PATENT DOCUMENTS

| | | | |
|---|---|---|---|
| 4,791,079 | 12/1988 | Hazbun | 502/4 |
| 5,240,480 | 8/1993 | Thorogood et al. | 96/4 |
| 5,306,411 | 4/1994 | Mazanec et al. | 204/265 |
| 5,342,431 | 8/1994 | Anderson et al. | 95/45 |
| 5,494,700 | 2/1996 | Anderson et al. | 427/115 |
| 5,534,468 * | 7/1996 | Stephenson | 252/521.1 |
| 5,549,850 * | 8/1996 | Garrigus | 252/521.1 |
| 5,624,542 | 4/1997 | Shen et al. | 204/283 |
| 5,702,999 | 12/1997 | Mazanec et al. | 501/152 |
| 5,712,220 | 1/1998 | Carolan et al. | 502/400 |

FOREIGN PATENT DOCUMENTS 778069   11/1997   (EP).

OTHER PUBLICATIONS

Yamamoto et al., "Perovskite–Type Oxides as Oxygen Electrodes for High Temperature Oxide Fuel Cells", Solid State Ionics, pp. 241–246 (1987) no month available.

Fu et al., "$(Y_{1-x}Ca_x)FeO_3$: A Potential Cathode Material for Solid Oxide Fuel Cells", Symposium on Solid Oxide Fuel Cells, Electrochem Soc. vol. 93–4, pp. 276–282 (1993) no month available.

* cited by examiner

*Primary Examiner*—Bruce F. Bell
(74) *Attorney, Agent, or Firm*—David M. Rosenblum

(57) ABSTRACT

A multi-phase solid electrolyte ion transport membrane comprising at least two phases wherein one of the phases comprises an oxygen ion single conductive material, or a mixed conductor. The other phase comprises an electronically-conductive metal or metal oxide that is incorporated into the membrane by deposition of the metal or metal oxide from a polymer made by polymerizing a chelated metal dispersion in a polymerizable organic monomer or prepolymer. The multi-phase composition advantageously comprises a first phase of a ceramic material and a second phase of a metal or metal oxide bound to a surface of the ceramic material. The multi-phase composition is advantageously prepared in an in-situ fashion before fabricating the membrane matrix. As another alternative, a preformed ceramic matrix is surface-coated with a metal or metal oxide.

25 Claims, 4 Drawing Sheets

MULTI-PHASE SOLID ELECTROLYTE IONIC TRANSPORT MEMBRANE AND METHOD FOR FABRICATING SAME

CROSS REFERENCE TO RELATED APPLICATION

This patent application is a continuation in part of U.S. patent application Ser. No. 08/775,683 entitled "Solid Electrolyte Membrane with Mechanically-Enhancing Constituents" that was filed on Dec. 31, 1996 now U.S. Pat. No. 5,911,860. U.S. Pat. No. 5,911,860 is incorporated herein by reference in its entirety.

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

This invention relates generally to a method for preparing solid electrolyte ion transport membranes and, more particularly, to such membranes having at least two phases wherein one of the phases comprises an oxygen ion conductive material, or a mixed conductor, and wherein the second phase comprises an electronically-conductive metal. The second phase is incorporated into the membrane by deposition of the metal from a chelated metal dispersion in an organic polymer. The invention is useful in fabricating ion transport membranes having porous catalytic surface exchange enhancements, and for making electrodes for solid oxide fuel cells.

BACKGROUND OF THE INVENTION

Solid electrolyte ion transport membranes have significant potential for the separation of oxygen from gas streams containing oxygen. Of particular interest are mixed conductor materials that conduct both oxygen ions and electrons and hence can be operated in a pressure driven mode without the use of external electrodes.

In an ionic or mixed conducting membrane reactor, a solid electrolyte membrane that can conduct oxygen ions with infinite selectivity is disposed between an oxygen-containing feed stream and an oxygen-consuming, typically methane-containing, product or purge stream. The membrane elements have "oxygen selectivity," which means that oxygen ions are exclusively transported across the membrane without transport of other elements, and ions of other elements. Such membranes may also be used in gas purification applications as described in European Patent Application Publication No. 778,069 entitled "Reactive Purge for Solid Electrolyte Membrane Gas Separation," issued to Prasad et al.

Composite ceramic mixed conductor membranes comprised of multi-phase mixtures of an oxygen ion conductive material and an electronically-conductive material are known. Exemplary multi-phase ceramic compositions of this type are disclosed in U.S. Pat. No. 5,306,411 (Mazanec et al.) and U.S. Pat. No. 5,478,444 (Liu et al.). Such compositions are also taught by C. S. Chen et al. in *Microstructural Development, Electrical Properties and Oxygen Permeation of Zirconia-Palladium Composites,* Solid State Ionics 76: 23–28 (1995). These patents and this technical journal article are all incorporated herein by reference in their entireties. In order to develop a membrane suitable for use in pressure driven oxygen separation, an electronic conductivity characteristic has to be added to pure ionic conductors, thereby creating multiphase mixed conductors. This is typically accomplished by adding an electronically-conductive phase, such as Pt or Pd, to the ionic conductor.

In contrast to multi-phase mixed conductors, true mixed conductors, which are exemplified by perovskites such as $La_{0.2}Sr_{0.8}CoO_x$, $La_{0.2}FeO_x$, $La_{0.2}Sr_{0.8}Fe_{0.8}Co_{0.1}Cr_{0.1}O_x$ and others, are materials that possess intrinsic conductivity for both electrons and ions. Some of these materials possess some of the highest oxygen ion conductivities known, as well as rapid surface exchange kinetics. U.S. Pat. No. 5,702,999 (Mazanec et al.) and U.S. Pat. No. 5,712,220 (Carolan, et al.) disclose mixed oxide perovskites of this type that are useful for oxygen separation. However, while there is great potential for these materials in gas separation applications, there are some drawbacks in their use.

A common problem among most ceramic mixed conductors, including perovskites, is their fragility and low mechanical strength in tension, which makes it difficult to fabricate large elements, such as tubes, and deploy them in commercial systems requiring high reliability. These problems have been recognized and reported in technical journal publications, such as, for instance, Yamamoto et al. in *Perovskite-Type Oxides as Oxygen Electrodes for High Temperature Oxide Fuel Cells,* Solid State Ionics 22: 241–46 (1987); and B. Fu et al. in $(Y_{1-x}Ca_x)$ $FeO_3$: *A Potential Cathode Material for Solid Oxide Fuel Cells,* Proc. 3rd Intl. Symp. on Solid Oxide Fuel Cells, S.C. Singhal, Ed., The Electrochem. Soc. Vol. 93-4: 276–282 (1993).

U.S. Pat. No. 5,911,860 discloses dual phase solid electrolyte ion transport materials comprised of a mixed conductor such as perovskite and a second phase such as Ag, Pd or an Ag/Pd alloy. This application points out that the introduction of a metallic second phase to a ceramic mixed or pure ion conductor such as perovskite prevents microcracking during fabrication of the membrane, and enhances the mechanical properties and/or surface exchange rates, as compared to those provided by a mixed conductor phase alone.

The introduction of a metallic second phase into ceramic mixed conductors is thus desirable for solid electrolyte ion transport membrane manufacture, not only for ceramic conductors, where the metallic phase is needed to achieve electronic conductivity, but also for true mixed conductors such as perovskites, where the metallic phase enhances mechanical properties and/or catalytic performance, as well as possibly enhancing the desired electronic conductivity. The most common technique disclosed in the prior art for introducing a metallic second phase into a solid electrolyte ion transport membrane is powder mixing. Illustrative of powder mixing techniques are the following patents:

(A) U.S. Pat. No. 5,306,411 (Mazanec et al.) discloses a typical powder mixing process to fabricate solid electrolyte ion transport membranes comprising gas impervious, multi-phase mixtures of an electronically-conductive material and an ion-conductive material and/or gas impervious, single phase mixed metal oxides of a perovskite structure. A mixture of $La(C_2H_3O_2)_3 \cdot 1.5H_2O$, $Sr(C_2H_3O_2)_2$ and $Co_3O_4$ was placed into a polyethylene jar mill, together with $ZrO_2$ media and acetone, and rolled for 70 hours. The resulting slurry was decanted and vacuum distilled at room temperature until dry. The solids were then calcined in air in an evaporating dish for 12 hours at 900° C. and 6 hours at 1100° C.

(B) U.S. Pat. No. 5,712,220 (Carolan et al.), discloses a membrane containing a dense multicomponent metallic oxide layer formed from $La_{0.2}Ba_{0.8}Co_{0.62}Fe_{0.21}O_{3-z}$. This composition was prepared by a powder preparation technique wherein various applicable weighed quantities of $La_2O_3$, $BaCo_3$, $CoO$, $Fe_2O_3$ and $CuO$ were mixed and ball milled for 12 hours. The mixture was then fired in air to 1000° C. for 24 hours followed by cooling to room temperature. The mixture was then ground by ball milling, remixed and refired. The resulting perovskite powder was milled in air to about 1–5 micron particle sizes and combined with a plasticizer, binder and toluene solvent to form a slip, suitable for tape casting.

(C) U.S. Pat. No. 5,624,542 (Shen et al.) discloses the production of a mixed ionic-electronic conducting ceramic/metal composite by ball milling, including the steps of mixing and grinding ceramic components with a metal powder or metal oxide, followed by forming and sintering to provide the desired membrane. Grinding of the metal and ceramic components in accordance with the '542 patent is said to produce a particle size for the ball-milled metal and ceramic components of from about 0.5 micron to about 1 micron.

Other techniques for adding second phase metallic materials to solid electrolyte ion transport membranes are also known. For example, U.S. Pat. No. 5,306,411 (Mazanec et al.) discloses a technique in which the ceramic precursor components are added to deionized water and the solution is spray-dried to produce small droplets having a diameter of about 20–50 microns. The droplets are then dehydrated with preheated dry air, resulting in a powder having an average particle size of approximately 5 microns.

U.S. Pat. No. 5,624,542 (Shen et al.) discloses generally, in column 6, lines 45–50 thereof, that mixed ionic-electronic conducting ceramic/metal composites can also be formed by chemical vapor deposition, electrochemical vapor deposition, dip-coating, and sol-gel processing. However, these methods differ in their result from the powder mixing and spray drying techniques described above. Because they are designed to be applied after the formation of a first phase membrane, these methods are more suited for the preparation of multi-layer separation membranes than composite mixed-conductor membranes. Thus, these prior art coating techniques are not suited for introducing a metal into solid electrolyte ion transport precursor materials prior to the formation of the solid electrolyte ion transport membrane.

Multi-layer separation membranes are known in the art. For example, Yasutake Teraoka et al. reported solid state gas separation membranes formed by depositing a dense mixed conducting oxide layer onto a porous mixed conducting support in Jour. Ceram. Soc. Japan. International Ed., Vol.97, No.4, pp.458–462 and No. 5, pp.523–529 (1989). The relatively thick porous mixed conducting support provides mechanical stability for the thin, relatively fragile dense mixed conducting layers. Other exemplary multi-layer ceramic membranes are disclosed in U.S. Pat. No. 4,791,079 (Hazbun); U.S. Pat. No. 5,240,480 (Thorogood et al.); U.S. Pat. No. 5,494,700 (Anderson et al.); and U.S. Pat. No. 5,342,431 (Anderson).

The Anderson et al. ('700) patent disclose a method for preparing a membrane substrate coated with a dense crack-free metal oxide film made by dissolving metal ions in a polymerizable organic solvent, such as ethylene glycol. Generally the method of the '700 patent comprises: (1) preparing a starting solution containing cations of the desired oxide's metal constituents dissolved in an aqueous mixture of the polymerizable organic solvent; (2) heating the starting solution to form a polymeric precursor; (3) depositing a thin film of the polymeric precursor onto a substrate using a conventional spin-coating technique; and (4) calcining the deposited precursor film to convert it into a polycrystalline metal oxide film.

The Anderson ('431) patent discloses a method for incorporating a metal oxide film onto a ceramic membrane comprising the steps of (a) passing a dilute colloidal suspension ("sol") of metal oxide particles suspended in water or alcohol by one side of a porous support, (b) converting the sol into a gel by removing the solvent, (c) drying the gel to form a "xerogel," and (d) sintering the xerogel to create a porous metal oxide ceramic membrane that is said to be useful in ultrafiltration, reverse osmosis, or gas separation.

In summary, the introduction of a metallic second phase into solid electrolyte ion transport membranes is a useful step in the fabrication of mixed ionic-electronic conducting ceramic composites, and creates materials with great potential for gas separation and solid oxide fuel cell electrodes. However, the techniques heretofore taught in the prior art for introducing a metallic second phase pose several difficulties for commercial utilization of this technology.

For instance, the existing techniques for introducing a metallic second phase into solid electrolyte ion transport membranes often result in overuse of the second phase metallic material, which increases costs. In a simple dual phase mixed conductor system comprised of an oxygen ion conductive material and an electronically-conductive material, the percolation theory is usually used to predict the volume fraction of the second (metallic) phase required to achieve electronic conductivity in a mixed conductor system. The value of the volume fraction typically falls in the range of about 30%, although this value can vary markedly, depending upon the relative sizing of the individual components.

Prior technical literature discloses that the metallic second phase usually constitutes more than 40% of the volume of the composite. This amount is typically necessary to ensure that the conducting phase is above the percolation limit in order to obtain a composite electronic/ionic mixed conductor. For example, a technical journal article *Microstructural Development, Electrical Properties and Oxygen Permeation of Zirconia-Palladium Composites,* Solid State Ionics 76: 23–28 (1995), C. S. Chen et al., reported that a percolative Yttria-stabilized cubic zirconia (YSZ)—palladium dual phase composite, containing 40% Pd by volume, showed a much larger oxygen permeability than that of a non-percolative composite containing 30% Pd by volume indicating a percolation limit between 30 and 40%. The high cost of a compatible second phase (e.g. Pd, Pt), coupled with the high volume required by the prior art techniques, makes it difficult to commercialize these solid electrolyte ion transport membranes.

Also, since the second phase is a pure electronic conductor, any excessive use of second phase material, which is typical of the prior art techniques, results in a reduction of the overall ionic conductivity of the composite, a clearly undesirable result for high performance in oxygen transport.

In the case of true mixed conductors, such as perovskites, to which a metallic second phase may be added to enhance mechanical properties and/or catalytic efficiency (see U.S. Pat. No. 5,911,860), conventional techniques for introducing the second phase may reduce the benefits derived from their use. In the prior art, dual phase solid electrolyte ion transport powders of these materials were usually prepared by mixing various weight ratios of second phase alloys and solid electrolyte ion transport powders using a conventional powder mixing process. However, during the conventional powder mixing process a non-uniform dispersion of the second phase can result in lower mechanical strength of the ceramic composite due to the lack of homogeneity of the mixed material.

There is need, therefore, for a new method for incorporating a metal or metal oxide into an ionic or mixed ionic/electronic ceramic membrane prior to fabricating the membrane in order to achieve a reduction in the amount of material required for the second phase and to attain a uniform surface deposition of the metal or metal oxide within the ceramic membrane substrate, thereby enhancing the mechanical properties and/or the overall transport efficiency of the membrane.

OBJECTS OF THE INVENTION

A first object of the invention is to provide an improved method for fabricating a multi-phase solid electrolyte ion transport membrane by providing uniform surface deposition of a metal or metal oxide onto a ceramic powder, and forming the membrane from the resultant multi-phase material with a reduced quantity of the second phase material.

A second object of this invention is to provide an improved solid electrolyte ion transport membrane, having enhanced mechanical and/or catalytic properties.

Another object of the invention is to provide methodology for achieving a continuous electron conductivity for a two phase conductor employing a mixture of ion and electron conducting materials where in the volume of the electron conducting second phase material is substantially reduced beyond conventional percolation limits.

A further object of this invention is to extend the above techniques to the fabrication of ion transport membranes having porous surface exchange enhancements for ion transport membranes, as well as electrodes of solid oxide fuel cells.

These and other objectives will become apparent from reading the following detailed description of the invention.

SUMMARY OF THE INVENTION

In one aspect, the present invention relates to a method for fabricating a multi-phase solid electroylte ion transport membrane. The membrane material comprises a first phase, in granulated or matrix form, comprising an ionic conductor or mixed ionic/electronic conductor, and a second phase comprising particles of a metal or metal oxide coating the surface of the granules of the first phase. The method comprises several steps. First, the metal ions are chelated into an aqueous or organic mixture comprising a polymerizable organic monomer or prepolymer plus a chelating agent. Second, this mixture is heated to a temperature sufficient to polymerize the polymerizable organic monomer or prepolymer in order to provide a liquid polymeric composition containing chelated metal or metal oxide particles. Third, the liquid polymeric composition containing the chelated metal or metal oxide is contacted with the granulated first phase, and mixed to provide a homogeneous admixture comprising the granulated first phase coated with the polymeric composition. Fourth, the homogeneous admixture is heated to a temperature sufficient to combust the polymeric composition and uniformly deposit the particles of metal or metal oxide onto the surfaces of the first phase granules. Lastly, the resulting multi-phase metal-coated solid electrolyte powder is optionally calcined in order to form a polycrystalline metal oxide coating on the surfaces of the first phase, and then further processed (e.g., by sintering or cold pressing) to form the desired multi-phase solid electrolyte ionic transport membrane.

In another aspect, the present invention relates to the multi-phase solid electrolyte ion transport membrane itself. The membrane, suitably fabricated by the method described above, comprises a matrix material that conducts at least one type of ion, preferably oxygen. This membrane comprises at least one constituent that is physically distinct from the matrix material, namely the second phase of metal or metal oxide. The second phase enhances the mechanical and/or catalytic properties of the membrane and provides electron conductivity to the membrane when ion-only conducting oxides are used. The second phase is suitably incorporated into the membrane as described above, namely by means of a dispersion of chelated metal or metal oxide dispersed in a polymerizable monomer or prepolymer. The second phase is present in the multi-phase membrane in a quantity that would normally preclude continuous electronic conductivity through the constituent across the membrane. In a preferred aspect, the matrix material comprises a mixed conductor which exhibits both electronic and oxygen ion conductivity, and the second phase metal is silver, palladium, an oxide thereof, or a combination thereof.

These and other aspects will become apparent upon reading the following detailed description of the invention.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
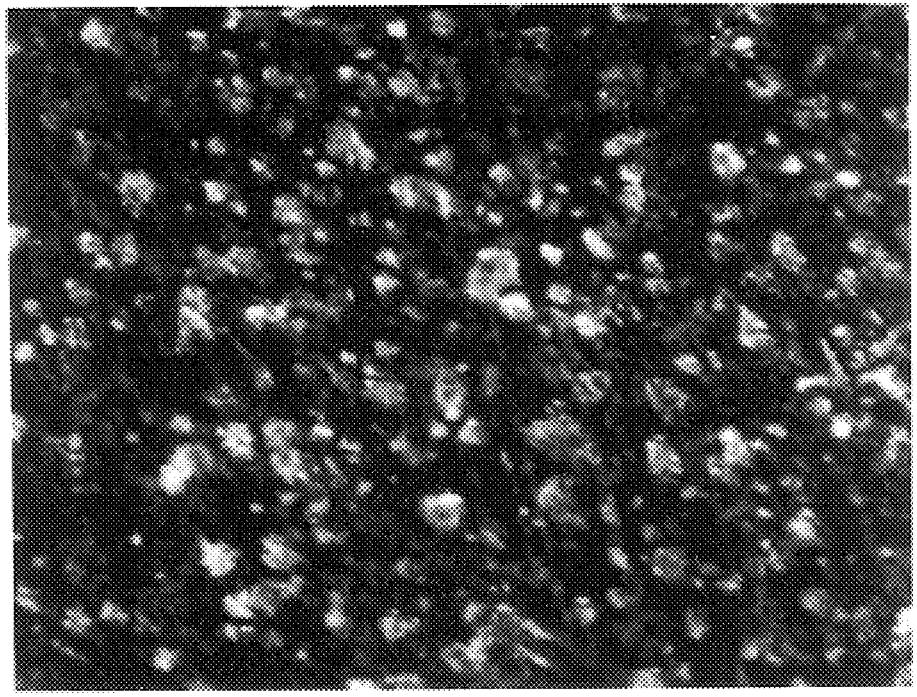
FIG. 1 is an optical photomicrograph of a disc made by a conventional powder mixed process displayed at a magnification of approximately 165 times.

The present invention relates, in one aspect, to a process for making multi-phase metal or metal oxide—coated solid electrolyte ion transport powder using a liquid polymeric precursor as a carrier for a chelated form of the metal or metal oxide. The products of this method are loose powders of solid electrolyte ion transport materials which are intimately coated with a second phase material, such as Pd, Ag or Pd/Ag alloy. The second phase is microscopically uniformly dispersed over, and bound onto, the surface of the solid electrolyte ion transport matrix. The result achieved is a more uniform distribution of the metal or metal oxide over the surface of the matrix than is achieved by mixing of separate powders in the absence of chelation of the metal. Moreover, the physical properties and ion transport characteristics of these two-phase membranes are much improved, as compared to single phase solid electrolyte ion transport membranes or multi-phase membranes, and as compared to coated membranes prepared by conventional coating methodology.

More particularly, dual phase solid electrolyte ion transport membranes fabricated in accordance with this invention are characterized by a second phase that is uniformly dispersed in the solid electrolyte ion transport matrix. These dual phase composite membranes exhibit enhanced mechanical and catalytic properties due to the improvement in homogeneity of the dispersed second phase. Furthermore, it was discovered that the improved homogeneity of the dispersed second phase results in a substantial decrease of the percolation threshold, which minimizes the use of second phase metals and therefore reduces the cost of fabricating composite solid electrolyte ion transport membranes.

Another advantage of the invention is that it results in much a smaller particle size for the second phase in the solid electrolyte ion transport matrix, as compared to the particle size provided by conventional mixing methods such as powder mixing. By way of illustration, second phase particles of silver or palladium, deposited by the technique disclosed herein, range from about 0.1 to about 0.2 microns, or approximately 2 to 10 times smaller than those produced by the method of Shen et al. The reduced size of the second phase particles increases the exposed surface area of the metal for a given amount of metal used, thereby enhancing the desired electronic transport without necessarily increasing the net volume of second phase material needed.

The process of this invention utilizes a liquid polymeric precursor formed by polymerizing a starting dispersion containing cations of the desired metal or metal oxide constituent in admixture with a chelating agent and a polymerizable organic monomer or prepolymer, preferably a monomer such as ethylene glycol polyacrylamide, malonic acid, polyacrylic acid, or a combination thereof. Useful chelating agents include citric acid, ethylenediamine, ethylenediamine tetraacetic acid (EDTA), and combinations thereof. The chelating agent is suitably present in the starting dispersion in an amount of from 10 to 40% based upon the weight of the dispersion. The monomer or prepolymer is suitably present in the starting dispersion in an amount of from 10 to 40% based on the weight of the dispersion.

At low temperature, the polymeric precursor forms a viscous liquid with excellent wetting properties to form a uniform coating on the surface of solid electrolyte ion transport powders. The precursor decomposes at high temperatures, leaving a uniform coating of second phase on the solid electrolyte ion transport powder.

The invention disclosed herein is intended to be applicable to mixed metal conducting oxide ceramics encompassed by the structure: $A_rA'_sA''_tB_uB'_vB''_wO_x$ where A, A'A'' are chosen from the groups 1, 2, 3 and the F block lanthanides; and B, B', B'' are chosen from the D block transition metals according to the Periodic Table of the Elements adopted by the IUPAC wherein $0<r\leq 1$, $0\leq s\leq 1$, $0\leq t\leq 1$, $0\leq u\leq 1$, $0\leq v\leq 1$, $0\leq w\leq 1$ and x is a number determined from stoichiometry that renders the compound charge neutral. Preferably, A, A', A'' of the enumerated structure is a Group 2 metal consisting of magnesium, calcium, strontium and barium. Illustrative lanthanide-containing metal oxide compositions also containing calcium or strontium are disclosed in U.S. Pat. No. 5,817,597 (Carolan et al.) Preferred mixed conducting oxides are presented by the formula $A'_sA''_tB_uB'_vB''_wO_x$ where A represents a lanthanide, Y, or mixture thereof, A' represents an alkaline earth metal or mixture thereof; B represents Fe; B' represents Cr, Ti, or mixture thereof and B'' represents Mn, Co, V, Ni, Cu or mixture thereof and s, t, u, v, and w each represents a number from 0 to about 1, and z is from stoichiometry.

A particularly preferred ceramic structure represented by the formula:

$A_xA'_{x'}B_yB'_{y'}O_{3-z}$ where

A is a lanthanide element;
A' is a suitable lanthanide element dopant;
B is selected from the group consisting of titanium, vanadium, chromium, manganese, iron, cobalt, nickel, zinc and mixtures thereof;
B' is copper;
$0.1\leq x<0.6$;
$0.4<x'\leq 0.9$;
$0.1\leq y\leq 0.9$;
$0.1\leq y'\leq 0.9$;
$0.9<(x+x')/(y+y')<1.1$;
and z is determined from stoichiometry.

This ceramic structure represented by the above formula for a preferred ceramic structure is the subject of commonly assigned, co-pending U.S. application Ser. No. 09/241,610.

The invention disclosed herein is also intended to cover oxygen ion-conducting materials or phases formed between oxides containing valent and trivalent cations such as calcium oxide, scandium oxide, yttrium oxide, lanthanum oxide, etc., with oxides containing tetravalent cations such as zirconia, thoria, and ceria. Some of the known solid oxide transfer materials of this variety include $Y_2O_3$-stabilized $ZrO_2$, CaO-stabilized $ZrO_2$, $Sc_2O_3$-stabilized $ZrO_2$, $Y_2O_3$-stabilized $Bi_2O_3$, CaO-stabilized $CeO_2$, $Y_2O_3$-stabilized $CeO_2$, $Gd_2O_3$-stabilized $CeO_2$, $ThO_2$, $Y_2O_3$-stabilized $ThO_2$, or $ZrO_2$, $ThO_2$, $CeO_2$, $Bi_2O_3$, or $HfO_2$ stabilized by addition of any one of lanthanide oxides or alkaline earth metal oxides. Many other oxides are known which have demonstrated oxygen ion-conducting ability that could be used in the multi-phase mixtures, and they are included in the present concept.

In accordance with a second aspect of the invention, a solid electrolyte ion transport membrane is provided. The membrane comprises a first phase, made from granulated or matrix material, which conducts at least one type of ion, preferably oxygen ions, and a second phase. The second phase, which is physically distinct from the matrix material, comprises a metal or metal oxide incorporated onto the surface of the granulated or matrix material by means of the dispersion described herein. The constituent is present a manner which increases the homogeneity of the phases within the matrix material, thereby enhancing the mechanical and/or catalytic properties of the matrix material while minimizing the amount of constituent material needed and also decreases the percolation threshold for the second phase.

A particularly advantageous multi-phase, composite material is comprised of a first mixed conductor phase, such as a perovskite and a second phase of a metal or metal oxide distributed uniformly on the surface of the first mixed conductor phase. This second phase tends to prevent microcracking of the membrane, eliminate special atmospheric control during processing and operation, and improve the mechanical properties, thermal cyclability, atmosphere cyclability and/or surface exchange rates over that of the mixed conductor phase alone. This second phase is suitably incorporated onto the surface of the mixed conductor granules using the above-described starting dispersion. The resulting dual-phase membrane exhibits improved mechanical properties, and preferably also exhibits improved catalytic properties, without sacrificing its oxygen transport performance. Further, this second phase can relieve compositional and other stresses generated during sintering, inhibit the propagation of microcracks in the mixed conductor phase and hence improve the mechanical properties (especially tensile strength) significantly. Since atmosphere control can be eliminated during sintering, manufacture is easier and less costly. The ability to eliminate atmosphere control during thermal cycling makes it substantially easier to deploy the membranes in practical systems which are more robust and better withstand transitional stresses created by temperature or gas composition variations.

Generally suitable ion transport membrane materials include ionic only and mixed conductors that can transport oxygen ions. If made according to the present invention, the mixed conductor phase may transport both oxygen ions and electrons independent of the presence of the second electronic conducting phase. Examples of mixed conducting solid electrolytes useful in this invention are provided in Table I below, but this invention is not limited solely to these material compositions listed therein. Dense matrix materials other than those comprised only of mixed conductors are also contemplated by this invention.

The method of the present invention will be particularly useful to the ceramic membrane manufacturing community since a common problem associated with such ceramic membranes is their fragility, and low mechanical strength under tension. This makes it difficult to fabricate large elements such as tubes and use them in commercial systems requiring high reliability. These limitations are overcome by the present invention. More specifically, as discussed above, the dual phase material comprised of the mixed conductor and the microscopically distributed second constituent phase tends to prevent undesired microcracking of the membrane during fabrication in air, and improve other mechanical properties of the membrane. The resulting membrane exhibits enhanced thermal/atmosphere cyclability and surface exchange rates, as compared to an analogous single-phase mixed conductor phase.

When provided as a porous coating on the surface of the membrane, the surface exchange properties of the membrane are enhanced.

TABLE I

Mixed Conducting Solid Electrolytes

Material Composition

1. $(La_{1-x}Sr_x)(Co_{1-y}Fe_y)O_{3-\delta}$ ($0 \leq x \leq 1$, $0 \leq y \leq 1$, $\delta$ from stoichiometry)
2. $SrMnO_{3-\beta}$
   $SrMn_{1-x}Co_xO_{3-\beta}$ ($0 \leq x \leq 1$, $\beta$ from stoichiometry)
   $Sr_{1-x}Na_xMnO_{3-\beta}$
3. $BaFe_{0.5}Co_{0.5}YO_3$
   $SrCeO_3$
   $YBa_2Cu_3O_{7-\beta}$ ($0 \leq \beta \leq 1$, $\beta$ from stoichiometry)
4. $La_{0.2}Ba_{0.8}CO_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ ($x,x',x'',y,y',y''$ all in 0–1 range; and z from stoichiometry)
   where:
   A,A',A" = from groups 1,2,3 and f-block lanthanides
   B,B',B" = from d-block transition metals
6. (a) Co—La—Bi type:
   | | |
   |---|---|
   | Cobalt oxide | 15–75 mole % |
   | Lanthanum oxide | 13–45 mole % |
   | Bismuth oxide | 17–50 mole % |

(b) Co—Sr—Ce type:
   | | |
   |---|---|
   | Cobalt oxide | 15–40 mole % |
   | Strontium oxide | 40–55 mole % |
   | Cerium oxide | 15–40 mole % |

(c) Co—Sr—Bi type:
   | | |
   |---|---|
   | Cobalt oxide | 10–40 mole % |
   | Strontium oxide | 5–50 mole % |
   | Bismuth oxide | 35–70 mole % |

(d) Co—La—Ce type:
   | | |
   |---|---|
   | Cobalt oxide | 10–40 mole % |
   | Lanthanum oxide | 10–40 mole % |
   | Cerium oxide | 30–70 mole % |

(e) Co—La—Sr—Bi type:
   | | |
   |---|---|
   | Cobalt oxide | 15–70 mole % |
   | Lanthanum oxide | 1–40 mole % |
   | Strontium oxide | 1–40 mole % |
   | Bismuth oxide | 25–50 mole % |

(f) Co—La—Sr—Ce type:
   | | |
   |---|---|
   | Cobalt oxide | 10–40 mole % |
   | Lanthanum oxide | 1–35 mole % |
   | Strontium oxide | 1–35 mole % |
   | Cerium oxide | 30–70 mole % |

7. $Bi_{2-x-y}M'_xM_yO_{3-\delta}$ ($0 \leq x \leq 1$, $0 \leq y \leq 1$, $\delta$ from stoichiometry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$
   where, x equals from zero to about 1.
9. One of the materials of $A_sA'_tB_uB'_vB''_wO_x$ family whose composition is disclosed in U.S. Pat. 5,306,411 (Mazanec et al.) as follows:

TABLE I-continued

Mixed Conducting Solid Electrolytes

Material Composition

|    |    |
|----|----|
|    | A represents a lanthanide or Y, or a mixture thereof; <br> A' represents an alkaline earth metal or a mixture <br> Thereof; <br> B represents Fe; <br> B' represents Cr or Ti, or a mixture thereof; <br> B" represents Mn, Co, V, Ni or Cu, or a mixture <br> thereof; <br> and s,t,u,v,w, and x are numbers such that: <br> s/t equals from about 0.01 to about 100; <br> u equals from about 0.01 to about 1; <br> v equals from zero to about 1; <br> w equals from zero to about 1; <br> x equals a number that satisfies the valences of the A, <br> A', B, B', B" in the formula; and <br> $0.9 < (s+t)/(u+v+w) < 1.1$ |
| 10. | One of the materials of $La_{1-x}Sr_xCu_{1-y}M_yO_{3-d}$ family, <br> where: <br>     M represents Fe or Co; <br>     x equals from zero to about 1; <br>     y equals from zero to about 1; <br>     d equals a number that satisfies the valences of La, <br>     Sr, Cu, and M in the formula |
| 11. | One of the materials of $Ce_{1-x}A_xO_{2-d}$ family, <br> where: <br>     A represents a lanthanide, Ru, or Y, or a mixture <br>     thereof; <br>     x equals from zero to about 1; <br>     d equals a number that satisfies the valences of Ce <br>     and A in the formula |
| 12. | One of the materials of $Sr_{1-x}Bi_xFeO_{3-d}$ family, <br> where: <br>     x equals from zero to about 1; <br>     d equals a number that satisfies the valences of Sr, <br>     Bi and Fe in the formula |
| 13. | One of the materials of $Sr_xFe_yCO_zO_w$ family, <br> where: <br>     x equals from zero to about 1; <br>     y equals from zero to about 1; <br>     z equals from zero to about 1; <br>     w equals a number that satisfies the valences of Sr, <br>     Fe and Co in the formula |
| 14. | Dual phase mixed conductors (electronic/ionic): <br> $(Pd)_{0.5}/(YSZ)_{0.5}$ (YSZ = yttria-stabilized zirconia) <br> $(Pt)_{0.5}/(YSZ)_{0.5}$ <br> $(B{-\!-}MgLaCrO_x)_{0.5}$ $(YSZ)_{0.5}$ <br> $(In_{90\%}Pt_{10\%})_{0.6}/$ $(YSZ)_{0.5}$ <br> $(In_{90\%}Pt_{10\%})_{0.5}/$ $(YSZ)_{0.5}$ <br> $(In_{95\%}Pr_{2.5\%}Zr_{2.5\%})_{0.5}/$ $(YSZ)_{0.5}$ <br> Any of the materials described in 1–13, to which a high <br> temperature metallic phase (e.g., Pd, Pt, Ag, Au, Ti, Ta, W) is <br> added |

In general, the major considerations in the selection of the second, phase materials are readily apparent. These include: (1) match of thermal expansion coefficients (TEC) of the second phase and the ion transport material; (2) chemical compatibility between the second phase and the ion transport material; (3) good bonding between the second phase and the matrix of the ion transport material; (4) ductility of the second phase to relieve stresses during sintering and cooling; and (5) low cost.

TEC match is important because stress is usually set up within and around the second phase as the composite material cools down from the temperatures it is exposed to during fabrication. Selection of a material with a less-than-desired match with the second phase material may cause unwanted delamination or cracking by the thermal stress imposed during fabrication and operation of the membrane. This can be minimized by reducing the difference in the expansion coefficients between that of the ion transport material and that of the second phase.

Chemical compatibility is important because the high temperature operation and processing of ion transport materials will cause interactions and interdiffusion between the ion transport material and the second phase that may lead to the degradation of the materials and reduce the membrane performance. Therefore, the second phase should be chemically inert or should not react undesirably with the ion transport material to avoid adverse interactions and interdiffusion at high temperatures.

Good bonding is important because delamination occurring between the second phase and the ion transport material could be deleterious to the strength of the material. Cracks or flaws could easily link up and cause a failure of the material.

Ductility of the second, constituent phase is important because many ion transport materials have very high thermal expansion coefficient. High TEC's give rise to high thermal stress during the processing and operation of the ion transport materials, which may result in failure of the materials. The ductility of the second phase may relieve the stresses generated during sintering and/or cooling.

In addition to the above considerations, the catalytic activity of the second phase preferably improves surface reaction kinetics of the composite ion transport membranes. Increased catalytic activity can mitigate an otherwise higher cost of the electronic conducting phase.

The second phase is suitably a single metal, such as silver, palladium, platinum, gold, rhodium, titanium, nickel, ruthenium, tungsten, tantalum, or alloys of two or more of such metals which are stable at membrane operating temperatures. Suitable high-temperature alloys include inconel, hastelloy, monel, and ducrolloy. Silver, palladium, or silver/palladium alloy are preferred. As another alternative, the second phase can be a ceramic, such as praseodymium-indium oxide mixture, niobium-titanium oxide mixture, titanium oxide, nickel oxide, tungsten oxide, tantalum oxide, ceria, zirconia, magnesia, or a mixture thereof. Some ceramic second phases, such as titanium oxide or nickel oxide, can be introduced in the form of oxides, then reduced to metal during the operation under a reducing atmosphere.

The following examples are set forth with specific materials and process conditions to specifically exemplify the invention and should not limit the invention in any way.

EXAMPLES

Example I

Dual Phase Solid Electrolyte Ion Transport Membrane Fabricated of Ag coated $La_{0.05}Sr_{0.95}CoO_{3-x}$ (A1)

Ag (about 0.1 to 0.2 $\mu$m) coated $A_1$ mixed conductor powder (average particle size about 1.0 $\mu$m, from SSC, Inc., Woodinville, Wash., now PSC of Praxair Surface Technologies, Inc.) with 20 wt. % of Ag produced by the following method:

(a) 10.2 grams of $AgNO_3$ were dissolved into 15 ml of H2O, followed by adding 2.9 grams of citric acid and 10 grams of ethylene glycol into the solution.

(b) The solution was stirred on a hot-plate (about 65° C.) until a clear solution was obtained.

(c) 5 grams of glycine were dissolved into the solution and then heated to about 100° C. to evaporate the water and accelerate the polymerization of chelating complexes.

(d) After about 10 minutes a viscous and transparent system was obtained. 25.9 grams of $A_1$ was then introduced into the system and a vigorous stirring was applied to obtain a homogeneous system.

(e) The system was then heated to about 300° C. on the hot plate until a thick paste was obtained, then the temperature was increased to about 500° C. to carry out a combustion process.

(f) After the combustion, the Ag coated $A_1$ was calcined at 600° C. for 4 hours, then milled and sieved for further applications. Dual phase discs were then prepared by mixing the Ag coated $A_1$ powder with 3 wt. % of PVB (Butvar of Monsanto) then pressed under a 1.5" die using a pressure of 10.4 kpsi. This was followed by burn-out of the binder while raising the temperature at the rate of 1° C./min from 25 to 400° C. The final temperature was held for one hour, and then sintering of the discs was effected at 1100° C. for 2 hours with a heating/cooling rate of 2° C./min in air.

Microstructures of the sintered discs were obtained using a Nikon Epiphot 200 optical microscope. X-ray diffraction (XRD) analyses were performed using a Rigaku miniflex diffractometer with Cu $K_\alpha$ radiation for the study of second phase formation within the solid electrolyte ion transport matrix. The oxygen permeation rate was measured using sintered disc specimens sealed in an alumina test cell with Ag paste. Tests were performed on three dense $A_2$ discs ($A_1$ with 20 wt. % Ag by conventional mixed powder) and three dense $A_3$ discs ($A_1$ coated with 20 wt. % Ag by current invention) of decreasing thickness (1.1 mm to 0.3 mm) at 900° C. under an air/helium gradient. A HP 5890 Gas Chromatograph and oxygen analyzer were used to analyze the gas compositions and calculate the oxygen fluxes.

Figure 2:
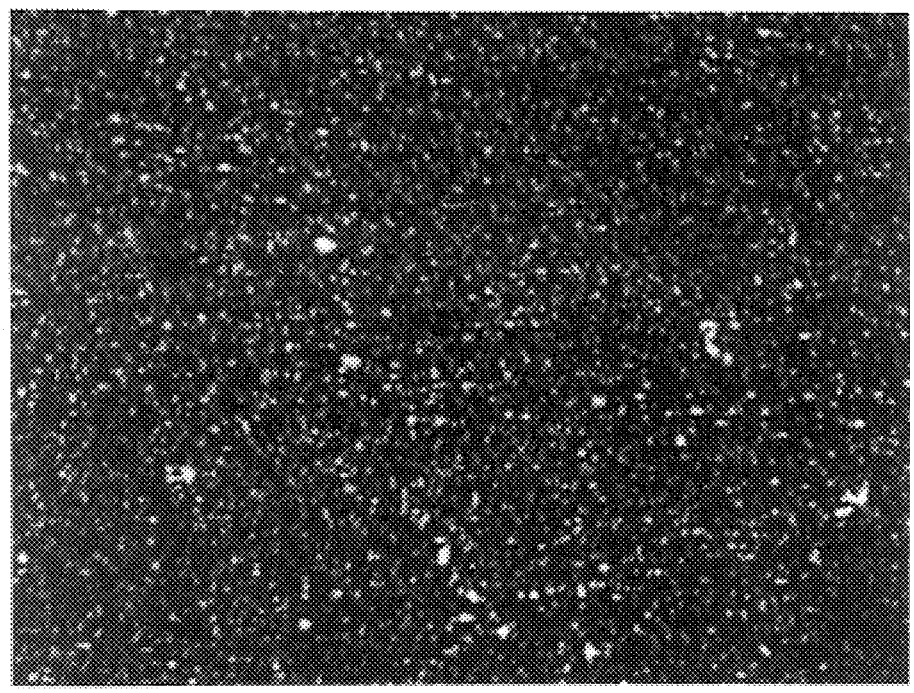
FIG. 2 is an optical photomicrograph of a disc made in accordance with the present invention displayed at a magnification of approximately 165 times.
Figure 3:
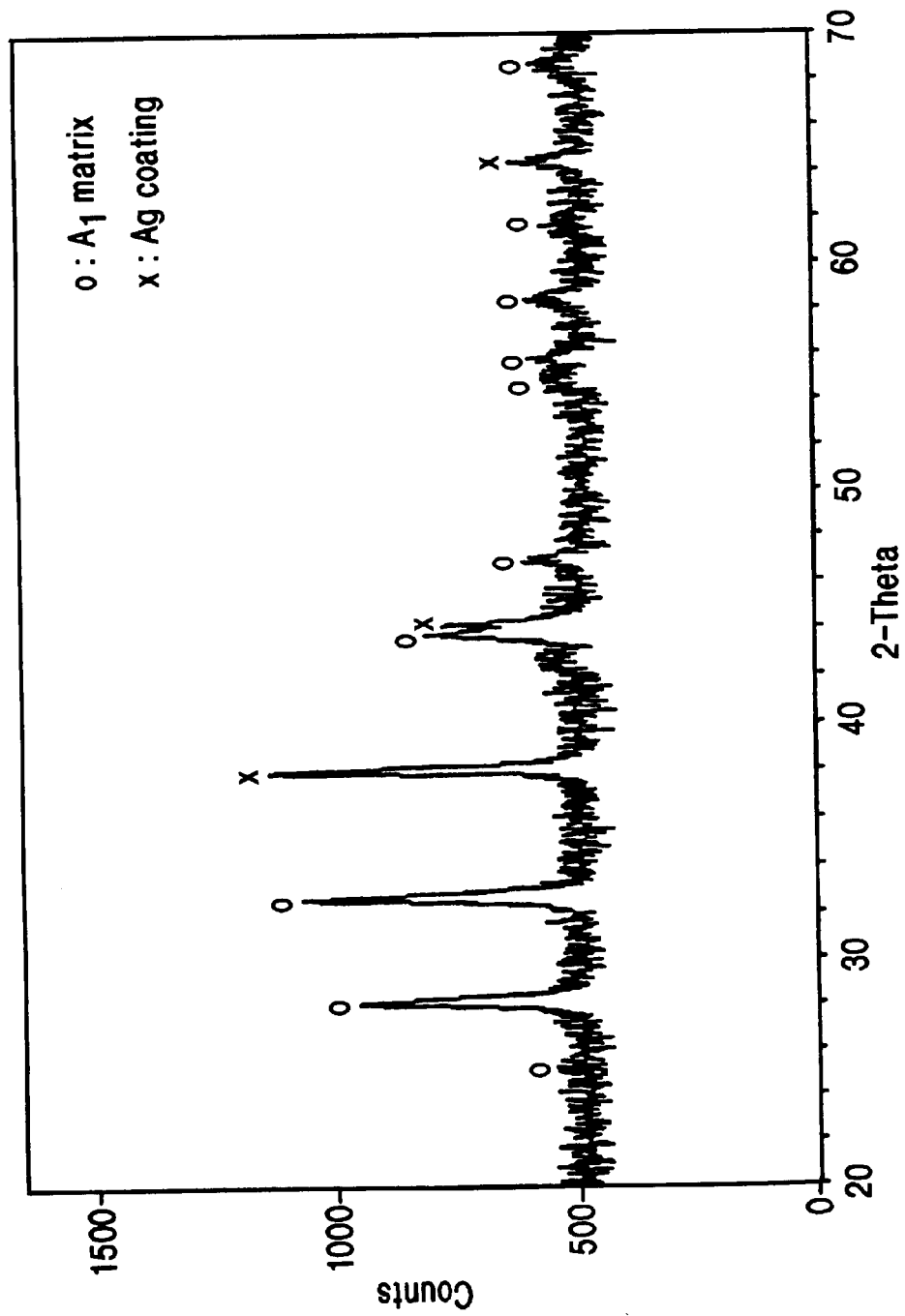
FIG. 3 is an X-ray diffraction pattern illustrating the formation of a silver coating (Ag coating) on the powder matrix ($A_1$ matrix) of the present invention.
Figure 4:
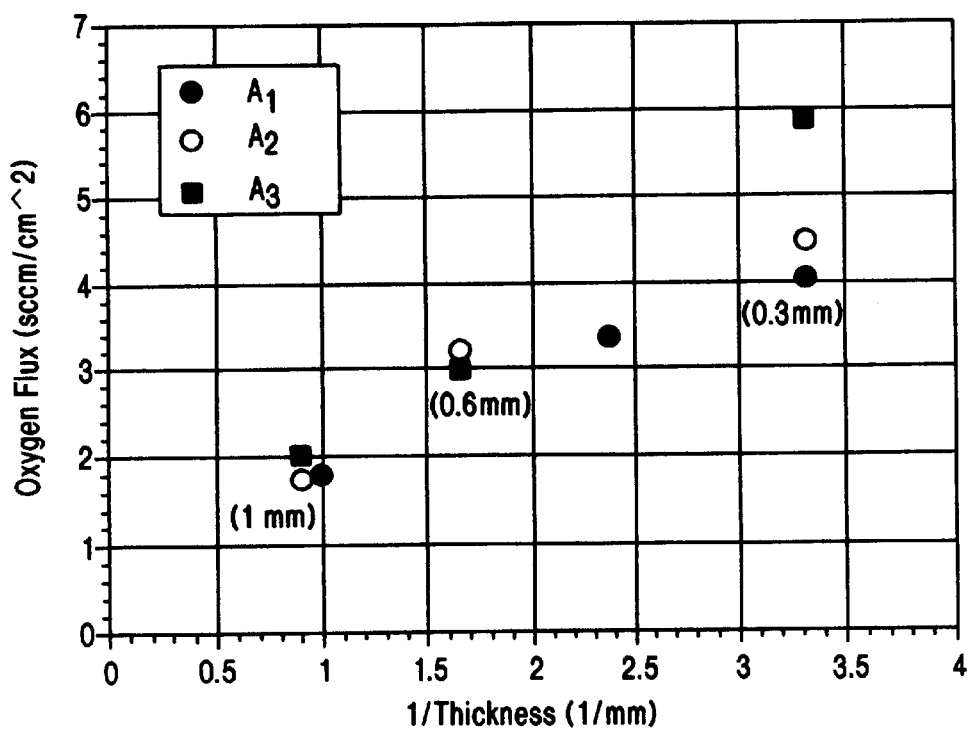
FIG. 4 graphically illustrates and compares oxygen flux as a function of thickness, at 900° C., through a single phase disc ($A_1$), a conventional dual phase disc ($A_2$), and a dual phase disc of the present invention ($A_3$).

FIG. 1 and FIG. 2 show optical photomicrographs of discs made by conventional powder processing methods and by the method of the present invention. Compared to the disc made by a conventional powder mixing process (FIG. 1), the disc obtained by the method of the current invention (FIG. 2) showed a much finer and more uniform dispersion of the second phase (white area) in the $A_1$ matrix. The X-ray diffraction ("XRD") result (FIG. 3) shows the formation of Ag coating within the $A_1$ matrix. It also reveals a good compatibility between the Ag coating and $A_1$ matrix without forming any other detectable phase. FIG. 4 shows the $O_2$ fluxes through the discs as a function of 1/thickness at 900° C. for $A_1$, $A_2$, and $A_3$. For 1.1 mm to 0.6 mm disks the $O_2$ fluxes of three compositions are comparable. For 0.3 mm disk the $O_2$ flux (5.9 sccm/cm$^2$) of $A_3$ is significantly higher than those of $A_1$ and $A_2$ (3.2 and 4.5 sccm/cm$^2$). The increase in $O_2$ flux with 1/t is also more linear with $A_3$ than the other two specimens suggesting that the surface exchange rates are more rapid with this material. The enhancement of surface kinetics of $A_3$ is another feature that can be attributable to the fine second phase (Ag) well-dispersed on the surface of $A_1$ matrix.

Example II

Dual Phase Solid Electrolyte Ion Transport Membrane Fabricated of 50/50 Pd/Ag (50Pd/50Ag) coated $La_{0.2}Sr_{0.8}Fe_{0.69}Co_{0.1}Cr_{0.2}Mg_{0.01}O_x$ (hereinafter, $B_1$).

A 20 wt. % of 50Pd/50Ag (about 0.1 to 0.2 $\mu$m) coated $B_1$ mixed conductor powder (average particle size ~1.0 $\mu$m, form SSC, Inc. Woodinville, Wash., now PSC of Praxair Surface Technologies, Inc.) was produced by the following method:

(a) 3.94 grams of $AgNO_3$ and 5.42 grams of $Pd(No_3)_2$ were dissolved into 15 ml of $H_2O$, followed by adding 2.24 grams of citric acid and 28 grams of ethylene glycol into the solution.

(b) The solution was stirred on a hot-plate (about 65° C.) until a clear solution was obtained.

(c) 3.5 grams of glycine were dissolved into the solution and then heated to about 100° C. to evaporate the water and accelerate the polymerization of chelating complexes.

(d) After about 10 minutes a viscous and transparent system was obtained. 20 grams of $B_1$ powder was then introduced into the system and vigorous stirring was applied to obtain a homogeneous system.

(e) The system was then heated to about 300° C. on the hot plate until a thick paste was obtained, then the temperature was increased to about 500° C. to carry out a combustion process.

(f) After the combustion, the 50Pd/50Ag coated $B_1$ was calcined at 600° C. for 4 hours, then milled and sieved for further applications.

Dual phase bars were prepared by mixing the 50Pd/50Ag coated $B_1$ powder with 3 wt. % of PVB (Butvar of Monsanto) then pressed in a rectangular die using a pressure of 10.4 kpsi followed by the binder burn-out process (1° C./min from 25 to 400° C. and hold for 1 hour), and sintered at 1250° C. for 2 hours with a heating/cooling rate of 2° C./min in air.

Figure 5:
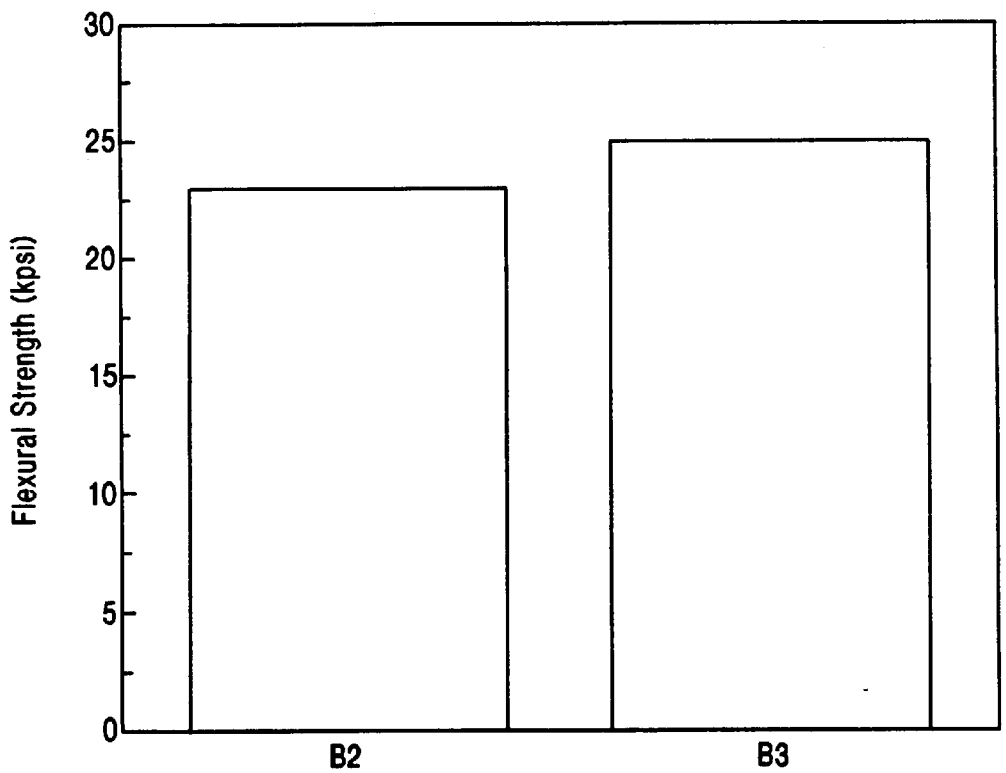
FIG. 5 graphically illustrates and compares flexural strength of a conventional disc ($B_2$) and a disc of the present invention ($B_3$).

Room temperature 3-point bending tests were performed on four bar specimens of $B_2$ ($B_1$ with 20 wt. % 50Pd/50Ag by current invention). All specimens (30×4×3 mm) were cut and polished using synthetic diamond discs prior to testing to avoid any edge imperfections. FIG. 5 shows the flexural strength comparison of $B_2$ and $B_3$ specimens under similar testing conditions. An average flexural strength of 25.0 kpsi was obtained for $B_3$. As compared to that of $B_2$ (23.0 kpsi), about 10% strength enhancement was obtained indicating that the mechanical strength of $B_2$ can be improved by the coating powder process due to the uniform finely dispersed second phase.

Example III

Dual Phase Solid Electrolyte Ion Transport Membrane Fabricated of 50Pd/50Ag coated $Ce_{0.8}Gd_{0.2}O_{2-x}$ (hereinafter, $C_1$).

20 wt. % (13 vol. %) of 50Pd/50Ag (about 0.1 to 0.2 μm) coated with $C_1$ powder (oxygen ion conductor with an average particle size about 1.0 μm, from SSC, Inc., Woodinville, Wash., now PSC of Praxair Surface Technologies, Inc.) was produced by the following method:

(a) 3.94 grams of $AgNO_3$ and 5.42 grams of $Pd(NO_3)_2$ were dissolved into 15 ml of $H_2O$, followed by adding 2.24 grams of citric acid and 28 grams of ethylene glycol into the solution.

(b) The solution was stirred on a hot-plate (about 65° C.) until a clear solution was obtained.

(c) 3.5 grams of glycine were dissolved into the solution and then heated to about 100° C. to evaporate the water and accelerate the polymerization of chelating complexes.

(d) After about 10 minutes a viscous and transparent system was obtained. 20 grams of $C_1$ powder was then introduced into the system and a vigorous stirring was applied to obtain a homogeneous system.

(e) The system was then heated to about 300° C. on the hot plate until a thick paste was obtained, then the temperature was increased to about 500° C. to carry out a combustion process.

(f) After the combustion, the 50Pd/50Ag coated $C_1$ was calcined at 600° C. for 4 hours, then milled and sieved for further applications.

Dual phase discs were prepared by mixing the 50Pd/50Ag (13 vol. %) coated $C_1$ powder with 3 wt. % of PVB (Butvar of Monsanto) then pressed under a 1.5" die using a pressure of 10.4 kpsi followed by the binder burn-out process (1° C./min from 25 to 400° C. and hold for 1 hour), and sintered at 1250° C. for 2 hours with a heating/cooling rate of 2° C./min in air.

The oxygen permeation rate was measured on sintered disc specimens sealed in an alumina test cell with Ag paste. Tests were performed on a $C_2$ disc ($C_1$ mixed with 50 vol. % of Pd by the conventional process) and $C_3$ discs ($C_1$ coated with 13 vol. % 50Pd/50Ag by the method of the current invention) at 900° C. under an air/helium gradient. A HP 5890 Gas Chromatograph and oxygen analyzer were used to analyze the gas compositions and calculate the oxygen fluxes.

Figure 6:
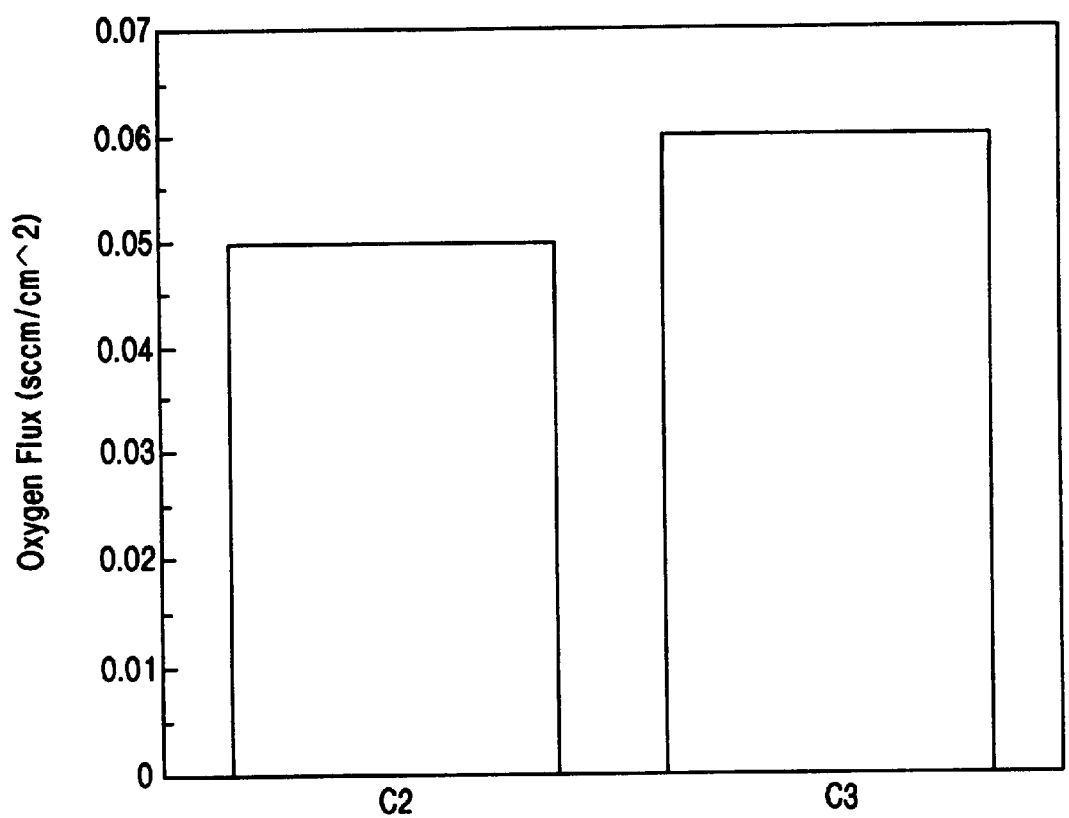
FIG. 6 graphically illustrates and compares oxygen flux through a conventional disc ($C_2$) and a disc of the present invention ($C_3$), at 900° C. under an air/helium gradient.

It was found that $C_3$ (13 vol. % of 50Pd/50Ag) is electronically conductive by 2-point impedance measurement after sintering at 1250° C. which indicates the percolation limit can be reduced to about 13 vol. % from 33 vol. % resulting from a conventional powder-mixed process using the method of the current invention. The cost of second phase using the current invention can be reduced about three-fold from that for a conventional powder-mixed process. FIG. 6 shows an oxygen flux comparison of $C_2$ and $C_3$ discs at 900° C. under an air/helium gradient. The oxygen flux of $C_3$ is slightly higher than that of $C_2$. This result demonstrates that the oxygen flux of $C_2$ can be improved by the process of the present invention by taking advantage of the resulting uniform surface-dispersion (and small particle size) of the metal oxide surface coating. This facilitates the use of a reduced amount of metal oxide second phase.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A method for fabricating a multi-phase solid electrolyte ion transport material comprising a granulated first phase coated with a second phase, the first phase comprising an ionic conductor or mixed ionic/electronic conductor and having a surface consisting of a plurality of granule surfaces, the second phase comprising metal particles of at least one metal or metal oxides, the method comprising the steps of:

(a) chelating metal ions in an aqueous mixture comprising a polymerizable monomer or prepolymer plus a chelating agent;

(b) polymerizing said polymerizable monomer or prepolymer by heating said mixture to a temperature sufficient to cause polymerization thereof, thereby forming a precipitate-free polymeric precursor containing metal cations;

(c) contacting the first phase with the polymeric precursor to form a homogeneous polymeric mixture in which at least a portion of the surface of the first phase is coated with the polymeric precursor; and (d) combusting the homogeneous polymeric mixture for a sufficient time and at a sufficient temperature to form the metal or metal oxide of the second phase and precipitate the metal or metal oxide onto the surface of the first phase.

2. The method of claim 1 further comprising the step, after the combusting step, of calcining the resulting multi-phase solid electrolyte ion transport material for a sufficient time and at a sufficient temperature to form a polycrystalline metal oxide coating on the surface of the first phase.

3. The method of claim 2 further comprising the steps, after the calcining step, of milling the resulting multi-phase solid electrolyte ion transport material to form a powder; and processing said powder to form a multi-phase solid electrolyte ion transport membrane in matrix form.

4. The method of claim 2 wherein said calcining is effected at a temperature of from 600° C. to about 1000° C.

5. The method of claim 1 wherein the polymerizing step is accelerated by adding glycine to the starting solution prior to heating.

6. The method of claim 1 wherein the polymerizable monomer or prepolymer is selected from the group consisting of ethylene glycol, polyacrylamide, malonic acid, polyacrylic acid, glucose, and combinations thereof.

7. The method of claim 1 wherein the chelating agent is selected from the group consisting of citric acid, ethylene diamine, ethylene diamine tetraacetic acid, and combinations thereof.

8. The method of claim 1 wherein the chelating agent is citric acid and the polymerizable monomer is ethylene glycol.

9. The method of claim 1 wherein the multi-phase solid electrolyte ion transport material has a percolation limit and the second phase is present in an amount below the percolation limit.

10. The method of claim 1 wherein the second phase is employed in an amount not exceeding ten percent by volume of the multi-phase solid electrolyte ion transport membrane.

11. The method of claim 1 wherein the second phase is selected from the group consisting of silver, palladium, platinum, gold, rhodium, ruthenium, tungsten, tantalum, titanium, nickel, silicon, lanthanide, yttrium, copper, cobalt, chromium, vanadium, zirconium, tantalum, manganese, molybdenum, niobium, aluminum, iron, and combinations thereof.

12. The method of claim 1 wherein the first phase is selected from the group consisting of perovskite, fluorite, and combinations thereof.

13. The method of claim 1 wherein the first phase is a substantially cubic perovskite having the structural formula:

$A_x A'_{x'} B_y B'_{y'} O_{3-z}$ where

A is a lanthanide element;

A' is a suitable lanthanide element dopant;

B is selected from the group consisting of titanium, vanadium, chromium, manganese, iron, cobalt, nickel, zinc and mixtures thereof;

B' is copper;

$0.1 \leq x < 0.6$;

$0.4 < x' \leq 0.9$;

$0.1 \leq y \leq 0.9$;

$0.1 \leq y' \leq 0.9$;

$0.9 < (x+x')/(y+y') < 1.1$;

and z is >0 and determined from stoichiometry.

14. The method of claim 1 wherein said polymerizable monomer comprises a hydrocarbon having at least two functional groups.

15. The method of claim 14 wherein said hydrocarbon is selected from the group consisting of ethylene glycol, propylene glycol, and combinations thereof.

16. The method of claim 1 wherein the polymerization of step (b) is effected by heating said polymerizable coating to temperature of from about 200° C. to about 400° C.

17. The method of claim 1 wherein the combusting step (c) is effected at a temperature of from about 400° C. to about 600° C.

18. A multi-phase solid electrolyte ion dense or porous matrix comprising:

(a) a first phase being an ion-conducting matrix material, and (b) a second phase being an electronic conducting metal or metal oxide uniformly distributed on a surface of said matrix, said second phase being deposited on a surface of said first phase by deposition of chelated metal oxide from a liquid polymerizable medium in which said second phase is chelated.

19. The matrix of claim 18 wherein said second phase is a metal which comprises less than 30% and more than about 5% of the volume of the matrix.

20. The matrix of claim 18 wherein said second phase is selected from the group consisting of silver, palladium, platinum, gold, rhodium, ruthenium, tungsten, tantalum, titanium, nickel, silicon, lanthanide, yttrium, copper, cobalt, chromium, vanadium, zirconium, tantalum, manganese, molybdenum, niobium, aluminum, iron or mixtures thereof.

21. The dense or porous matrix of claim 18 comprising a first ion conducting oxide phase and a second electron conducting metal or metal oxide phase occupying less than 15% but more than about 5% of the matrix volume where the matrix exhibits mixed ion and electronic conductivity.

22. The matrix of claim 21 where the matrix is dense and serves as an ion transport membrane.

23. The matrix of claim 21 where the matrix is porous and serves as a surface exchange enhancement for an ion transport membrane.

24. The matrix of claim 21 where the matrix is porous and serves as an electrode of a solid oxide fuel cell.

25. A method for fabricating a multi-phase solid electrolyte ion transport membrane, an ion transport membrane having a porous catalytic surface exchange enhancement, or a porous solid oxide fuel cell electrode which comprises the steps of:

(a) contacting a first phase of ceramic mixed conductor granules with a second phase being a polymerizable liquid composition comprising a polymerizable monomer or prepolymer containing a chelated metal ion, said contacting being effective to coat a surface of said ceramic mixed conductor granules with said polymerizable liquid composition to provide a polymerizable coating on said mixed conductor granules.

(b) polymerizing said polymerizable coating by applying energy to said coating in the form of heat or light in an amount sufficient to cause polymerization of the polymerizable monomer or prepolymer to form a polymer containing said metal ion, (c) combusting said polymer and oxidizing said metal ion to a metal or metal oxide, and precipitating said metal or metal oxide on said surface of said mixed conductor granules to provide metal or metal oxide-coated mixed conductor powders, and (d) calcining said metal or metal oxide-coated granules at an elevated temperature to provide said multi-phase powder in order to provide an article of manufacture selected from the group consisting of said solid electrolyte ion transport membrane, said porous catalytic surface exchange enhancement, said porous solid oxide fuel cell electrode, and combinations thereof.

* * * * *